Sept. 30, 1969  S. A. SZUMSKI ET AL  3,470,011
PROCESS FOR APPLYING LIQUID BIOLOGICALS TO
APPLICATORS FOR INTRACUTANEOUS INJECTION
Filed Feb. 7, 1967

INVENTORS
STEPHAN ALOYSIUS SZUMSKI
HERBERT BENNETT UHL
BY

ATTORNEY ved Sept. 30, 1969

3,470,011
PROCESS FOR APPLYING LIQUID BIOLOGICALS TO APPLICATORS FOR INTRACUTANEOUS INJECTION
Stephen Aloysius Szumski, Pearl River, N.Y., and Herbert Bennett Uhl, River Edge, N.J., assignors to American Cyanamid Company, Stamford, Conn., a corporation of Maine
Filed Feb. 7, 1967, Ser. No. 614,484
Int. Cl. B44d 1/40; A61b 17/20
U.S. Cl. 117—47                    6 Claims

ABSTRACT OF THE DISCLOSURE

A process is shown for depositing a predetermined amount of dried coating on the tines of an intracutaneous applicator. The tines are first chilled to a temperature below the freezing point of a liquid product containing a physiologically active product and are then immersed in the liquid for a length of time sufficient to freeze a predetermined volume of the product onto the tips of the tines. The tines are thereafter removed from the liquid and allowed to air dry to deposit the predetermined solid dosage on the tines.

Background of the invention

Applicators for intracutaneous administration of biologicals were originally needles which were used to scratch through the skin. This proved to have some drawbacks, and a more modern apparatus is an applicator with multiple tines and preferably with provision for mounting under sterile conditions. Typical of such modern applicators are those described in the Taylor et al. Patents 3,123,212, Mar. 3, 1964, and 3,246,647, Apr. 19, 1966.

Biologicals are coated on the tines of applicators by repeated dipping of the tines obtaining a coating of biological, drying it, and then dipping again if the amount of biological is insufficient for the desired use. The drying can be at room temperature or freeze drying methods can be used. The applicators are then sterilized, for example with ethylene oxide gas, and packaged in sheets, from which they can be removed while still sterile and used for inoculation. The repeated dipping and drying, which in the case of tuberculin may be from 8 to 10 times, increases the cost and can result in variation in dosage.

Summary of the invention

The present invention is directed to an improved method of producing a dried coating on the tines of an applicator in a single dip and under conditions which permit accurate dosage. According to the present invention the tine or tines of an applicator are chilled to a very low temperature, for example by liquid nitrogen, solid carbon dioxide, expanding gases such as the refrigerants sulfur dioxide, ammonia, fluorocarbons or chlorofluorocarbons, and the like. The very cold tines are then dipped into the liquid product in an atmosphere which is free from moisture, for reasons which will be set out more particularly below. The preferred type of product, namely biologicals, will be used below as an illustration.

The very cold tine freezes a small globule of the biological on its end. The dosage, that is to say, the amount of dry weight of biological, depends on a number of factors, the temperature of the tine, the size of its point, the temperature of the liquid biological and, very importantly, the length of time in which the tine is submerged. By proper control of these factors, which is a very easy matter, exactly uniform frozen globules of biological adhere to each tine. The applicator is then withdrawn and air dried at temperatures above freezing, for example at room temperature. The frozen globule melts, spreads by surface tension over a suitable area of each tine, and then is dried in place. Packaging and sterilization are then effected, but the present invention does not alter these last two steps and so they may be carried out, for example, as described in the two Taylor et al. patents referred to above.

During the dipping of the very cold tines in the biological, certain precautions are usually desirable, although not absolutely essential in the case of all biologicals. The very cold tine can condense moisture from the air if it is exposed to a moist atmosphere while still at its very low temperature. This can affect the spread of the frozen biological on melting and may sometimes effect a desirable control measure. The condensation on the tine, of course, heats the tine up and so determines the amount of liquid biological which will freeze on the tip in a given time. This is particularly serious if the atmosphere has a varying humidity. It is therefore preferred, and this constitutes a specific embodiment of the invention, to effect the dipping and freezing of the globules of biological in a substantially moisture free atmosphere. This is sometimes also desirable after dipping and before drying has proceeded sufficiently. This is not difficult to effect and can be done very simply when liquid nitrogen is used to chill the tines, a preferred modification, by the fact that the nitrogen evaporating from the surface of the liquid is dry.

Reference has been made to tines on an applicator where these sharp points or point is produced by stamping from sheet metal, as is described in the Taylor patents. These sharp points are actually in the physical form of tines. However, they could be sharp needles or other sharp points of suitable material. As they behave in the same manner, they will be referred to as tines regardless of their cross sectional shape, and it should be understood that in the specification and claims the word is used in a somewhat more general meaning.

The nature of the biological which is to be applied to the tines of the applicator is not changed by the present invention, and any biological which can be produced in liquid form of uniform concentration may be used. It is another advantage of the invention that over an enormous range the viscosity of the liquid is immaterial. Typical illustrations of bilogicals are tuberculin, cowpox vaccine, histoplasmin, etc. The process of the present invention is, however, not limited to these particular biologicals, which are mentioned simply as typical examples.

The improved process of the present invention produces an applicator with accurately predetermined dosages of dried biological on its tines. These are very useful for human intracutaneous injection, as is very common for such operations as tuberculin test, small pox vaccination and the like; however, the applicators can be used, of course, in veterinary medicine exactly as in humans and the process of the present invention is equally applicable. In the case of veterinary uses, other biologicals are often needed and, therefore, the more specific description of the present invention in conjunction with biologicals which are useful for humans is not intended to limit the invention thereto.

The applicators may be hand dipped in carrying out the process of the present invention, and for many cases this is entirely satisfactory; however, since accurately predetermined dosages can readily be obtained by dipping tines of predetermined low temperature in biological solutions of constant temperatures, for example room temperature, for a definite time, the process lends itself readily to automation. A group of applicators can be chilled by dipping in liquid nitrogen or otherwise exposing to suitable refrigerant and then dipped in biological for an accurately predetermined time. The process can also be used with a strip of punched tines before cutting and attaching to the applicators. This lends itself to a continuous, automated operation. It is an advantage of the present invention, therefore, that manual operation is not essential. In every case, however, whether manual or automatic, there is the great saving of time, because a single dip is used for a relatively short period and an extremely accurate and uniform dosage is obtained.

Description of the preferred embodiments

Figure 1:
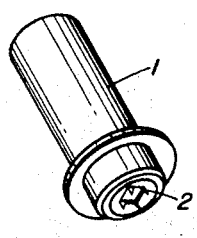
FIGS. 1 to 7 show a series of operations, FIG. 1 being in isometric and the others in elevation.
Figure 2:
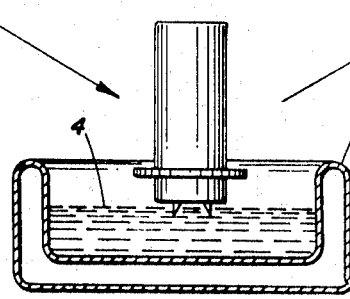
Figure 3:
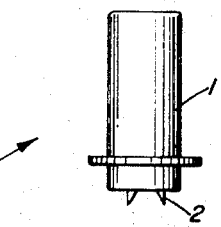
Figure 4:
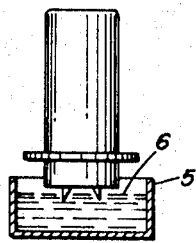
Figure 5:
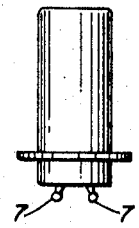
Figure 6:
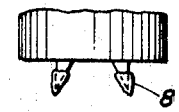
Figure 7:
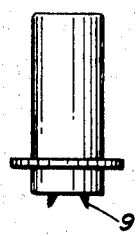

The figures show the coating with biologicals of a typical applicator with four triangular tines punched out of sheet metal. This is the preferred form described in the Taylor patents referred to above. In FIG. 1 the body of the applicator is shown at 1 with the tines at the bottom at 2. In FIG. 2 the applicator is shown as moved in the direction of the arrow and its tines dipped under the surface of liquid nitrogen, which is kept in a suitable Dewar container 3. The tines remain in the liquid nitrogen until they have achieved the desired low temperature. Preferably they are chilled down to the boiling point of liquid nitrogen, approximately −195° C. This obviously does not require critically accurate timing. Shorter immersion times can be used to obtain different temperatures, but the automatic temperature control by allowing sufficient immersion time to come to equilibrium with the liquid nitrogen presents so many practical advantages that it is preferred. It should be noted that during the chilling of the tines they are in an atmosphere of dry nitrogen above the surface of the liquid nitrogen and, therefore, there is no possibility of condensation of water from a moist atmosphere.

The applicator is removed, as shown in FIG. 3, and immediately dipped in a solution of biological, which is shown in FIG. 4, the surface of the biological being indicated at 6 and the container or trough in which it is contained at 5.

The applicator is retained in the biological, which should be at reasonably uniform temperatures for an exact period of time, during which small globules of the biological freeze on the ends of the tines. When the applicator is removed, as is shown in FIG. 5, these globules or spheres are indicated at 7. The applicator is now in an atmosphere which may be at room temperature or slightly higher, and this causes the globules 7 to melt and to flow by surface tension into thin films on the tines, the films being shown at 8 in FIG. 6. These films are then dried until a solid residue 9 is formed, which is shown in FIG. 7. In practice it is not at all necessary that the applicators be in separate locations for the illustrations in FIGS. 6 and 7 or even FIGS. 5, 6 and 7; they may be immediately transferred into a suitable dryer where a gentle current of dry warm air is passed over them. The illustration in the drawing is deliberately made in separate figures to illustrate the different phases through which the frozen globules pass until the biological is finally dried, as shown in FIG. 7.

Reference has been made to the globules spreading out as films. This should not be considered as connoting extremely thin films, as the film formed can be, and usually is, much thicker than when a tine at about the temperature of the biological solution is dipped and a very thin film adheres to the tine and is then dried, which was necessary in the prior art. In the present case, as has been described, the required final dosage is obtained in the form of the sphere 7 in FIG. 5, and these will normally melt and flow to a considerably thicker coating than any one coating of the multiple dip process used in the prior art. In a typical case the volume may be from eight to ten times as great.

The present invention is a process and not a machine and, therefore, the drawings illustrate the sequence of steps in a form which is semi-diagrammatic in nature. The invention is not at all concerned with the mechanical designs of the containers 3 or 5 or whether means are provided for automatic dipping of a number of applicators at the same time. It is an advantage of the process of the present invention that it is not limited to any particular design of apparatus.

The invention will be further described in connection with several examples.

EXAMPLE 1

A series of four tine applicators such as are described in the Taylor et al. patents above referred to were exposed to liquid nitrogen by dipping below the surface for sufficient time to reduce them to approximately −195° C. As pointed out above, this time is not particularly critical. A series of applicators with the chilled tines were then lowered into a trough containing tuberculin broth at room temperature. The applicators were lowered so that the tips of the tines were immersed in the tuberculin broth and held there for sufficient time to freeze the proper volume of dosage on each tine; for tuberculin and at the temperature of −195° C. of the tines, this time is one second. At the end of the second, the applicators are removed from the tuberculin broth and are transferred to a dryer in which a stream of warm air passes over the tines. Up to the time that they enter the dryer the tines are maintained in a moisture free atmosphere, for example the dry nitrogen evaporated from the liquid nitrogen in the first step of chilling down the tines. The frozen tuberculin melted, spread upward over a larger portion of each tine, and after drying, testing showed that each applicator contained the proper amount of tuberculin for a tuberculin test.

EXAMPLE 2

The procedure was repeated by exposing the tines to solid carbon dioxide. This chilled them down to the temperature of solid carbon dioxide, which is higher than that of liquid nitrogen, and so in the second step they remain in the tuberculin broth for a longer period of time than one second in order to obtain the same desired volume of tuberculin frozen onto the tip of each tine. The carbon dioxide atmosphere from the subliming carbon dioxide surrounds the tines during the chilling and keeps them from encountering moist atmosphere. The effect is the same as with dry nitrogen in Example 1. The drying of the frozen globules of tuberculin proceeds in precisely the same manner as described in Example 1.

EXAMPLE 3

The procedure of Examples 1 or 2 was repeated using an aqueous dispersion of cowpox vaccine. The period of time during which the tines are in the vaccine is determined by the temperature of the vaccine and its concentration so that the desired dosage is frozen onto the tip of each tine.

While the fairly accurate timing in contact with the biological which is described above is a desirable modification of the invention and particularly lends itself to automated operation, it is possible, where a sufficiently large amount of the biological is to be frozen onto a tine, to permit the tines to remain in contact with the biological until they have warmed up to a temperature just below freezing. This eliminates the necessity for a very short immersion time which must be accurately maintained, but it still requires that the total time be fixed, otherwise the tines can warm up to above freezing and some of the globules frozen onto their ends can re-melt. However, as the freezing occurs less rapidly as the tines near the freezing temperature there is somewhat less critical timing. Particularly for automated operation, however, very cold tines which are immersed for very short times in the biological solutions present definite advantages.

EXAMPLE 4

Procedures of Examples 1 to 3 are repeated with the biological histoplasmin. The same accurate dosage was finally obtained in dried form on the tines of the applicator.

The invention has been described in connection with biologicals, its most important use. The process is, however, equally applicable to other physiologically active materials such as diagnostics, antibiotics, etc.

We claim:

1. A process of applying a physiologically active product to tines of an intracutaneous applicator comprising, (a) chilling the tines to a temperature below the freezing point of a liquid product containing a physiologically active product, (b) immersing the tines in the said liquid product for a predetermined time to freeze a predetermined volume of product onto the tips of the tines, (c) air drying the tines at a temperature sufficiently high to melt the frozen product from their tips and permit it to flow over the surface of the tines.

2. A process according to claim 1 in which said steps (a) and (b) are carried out in contact with an essentially moisture free atmosphere.

3. A process according to claim 2 in which the chilling of the tines in step (a) is effected by immersing in liquid nitrogen until the tines achieve approximately the temperature thereof and the moisture free atmosphere is dry nitrogen boiling from the liquid nitrogen.

4. A process according to claim 3 in which the product is tuberculin.

5. A process according to claim 3 in which the product is histoplasmin.

6. A process according to claim 3 in which the product is cowpox vaccine.

References Cited

UNITED STATES PATENTS

| | | | |
|---|---|---|---|
| 1,878,483 | 9/1932 | Forrer | 264—306 |
| 2,779,332 | 1/1957 | Corper et al. | 128—253 |
| 3,010,455 | 11/1961 | Cooper | 128—253 |

ALFRED L. LEAVITT, Primary Examiner

C. R. WILSON, Assistant Examiner

U.S. Cl. X.R.

117—113, 119.2; 128—253